(12) United States Patent
Griess et al.

(10) Patent No.: US 7,735,779 B2
(45) Date of Patent: Jun. 15, 2010

(54) OPTIMIZED FUSELAGE STRUCTURE

(75) Inventors: Kenneth H. Griess, Kent, WA (US);
Gary E Georgeson, Federal Way, WA (US)

(73) Assignee: The Boeing Company, Irvine, CA (US)

( * ) Notice: Subject to any disclaimer, the term of this patent is extended or adjusted under 35 U.S.C. 154(b) by 853 days.

(21) Appl. No.: 11/555,829

(22) Filed: Nov. 2, 2006

(65) Prior Publication Data
US 2008/0105785 A1 May 8, 2008

(51) Int. Cl.
*B64C 1/00* (2006.01)
(52) U.S. Cl. ........................... 244/119; 244/120
(58) Field of Classification Search ............. 244/117 R, 244/119, 120, 125, 106; D12/319; 52/630, 52/790.1; 428/116–120, 304.4
See application file for complete search history.

(56) References Cited

U.S. PATENT DOCUMENTS

| | | | |
|---|---|---|---|
| 3,511,456 A * | 5/1970 | Fehring et al. | 244/102 R |
| 4,593,870 A | 6/1986 | Cronkhite et al. | |
| 4,674,712 A | 6/1987 | Whitener et al. | |
| 6,834,833 B2 | 12/2004 | Sankrithi | |
| 6,959,894 B2 | 11/2005 | Hayashi | |
| 2002/0153454 A1 | 10/2002 | Seidel | |
| 2005/0061916 A1 | 3/2005 | Sankrithi | |
| 2007/0108347 A1 | 5/2007 | Sankrithi et al. | |

FOREIGN PATENT DOCUMENTS

| | | |
|---|---|---|
| WO | 199715492 | 5/1997 |
| WO | 2007057411 | 5/2007 |

OTHER PUBLICATIONS

UK Intellectual Property Office, Combined Search and Examination Report under Sections 17 and 18(3), for United Kingdom Patent Application No. GB0721312.7, dated Feb. 13, 2008.
"Aeronautics Lifting Fuselage: The Lifting Fuselage Body." Meridian International Research. http://www.meridian-int-res.com/Aeronautics/Burnelli.htm.
Fuselage. http://wikipedia.org/wiki/Fuselage.
Ilcewicz, L.B. "Advanced Technology Composite Fuselage—Program Overview." NASA Contractor Report 4734, Apr. 1997.
Longeron. http://wikipedia.org/wiki/Longeron.

* cited by examiner

*Primary Examiner*—Michael R Mansen
*Assistant Examiner*—Joshua J Michener
(74) *Attorney, Agent, or Firm*—Charles L. Moore; Moore & Van Allen, PLLC

(57) ABSTRACT

A fuselage structure including an upper fuselage portion defined by a first cross-section including at least three different radii of curvature. The fuselage structure may also include a lower fuselage portion defined by a second cross-section including at least three different radii of curvature, wherein the first cross-section is different from the second cross-section.

37 Claims, 8 Drawing Sheets

OPTIMIZED FUSELAGE STRUCTURE

BACKGROUND OF THE INVENTION

The present invention relates to aircraft, aerospace vehicles or the like and more particularly to an optimized fuselage structure for an aircraft or aerospace vehicle.

Large aircraft fuselages are structurally designed to endure the effects of vehicle maneuvers in the air and on the ground. The altitude of vehicle flight requires that internal fuselage pressure is maintained at levels comfortable to pilots and passengers. Because of the combination of these loads, properties of aluminum material, and structural configuration (skin, stringer, and other structural members), circular cross-sectional fuselages have been the standard structure. However, circular cross-sectional designs may not provide the lowest possible drag and do not generate lift under any flight conditions. Additionally, circular fuselage cross-sections may not be the optimum for passenger seating, cargo containment, and rotational clearance for take-off and landing where circular cross-sectional fuselages may require longer landing gear for added clearance and thus add weight to the aircraft.

BRIEF SUMMARY OF THE INVENTION

In accordance with an embodiment of the present invention, a fuselage structure may include an upper fuselage portion defined by a first cross-section including at least three different radii of curvature. The fuselage structure may also include a lower fuselage portion defined by a second cross-section including at least three different radii of curvature, wherein the first cross-section may be different from the second cross-section.

In accordance with another embodiment of the present invention, a fuselage structure may include an upper fuselage portion including a composite sandwich structure and a non-circular cross-section defined by a first set of varying radii of curvature. The fuselage structure may also include a lower fuselage portion including another composite sandwich structure and a non-circular cross-section defined by a second set of varying radii of curvature, wherein the first set of varying radii is different from the second set of varying radii.

In accordance with another embodiment of the present invention, an aircraft may include a fuselage and a wing attached to the fuselage. The fuselage may include an upper fuselage portion defined by a first cross-section including at least three different radii of curvature. The fuselage may also include a lower fuselage portion defined by a second cross-section including at least three different radii of curvature, wherein the first cross-section may be different from the second cross-section.

In accordance with another embodiment of the present invention, a method for making a fuselage structure may include forming an upper fuselage portion including a non-circular cross-section defined by a first set of varying radii of curvature. The method may also include forming a lower fuselage portion including a non-circular cross-section defined by a second set of varying radii of curvature, wherein the first set of varying radii is different from the second set of varying radii.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

Figure 1:
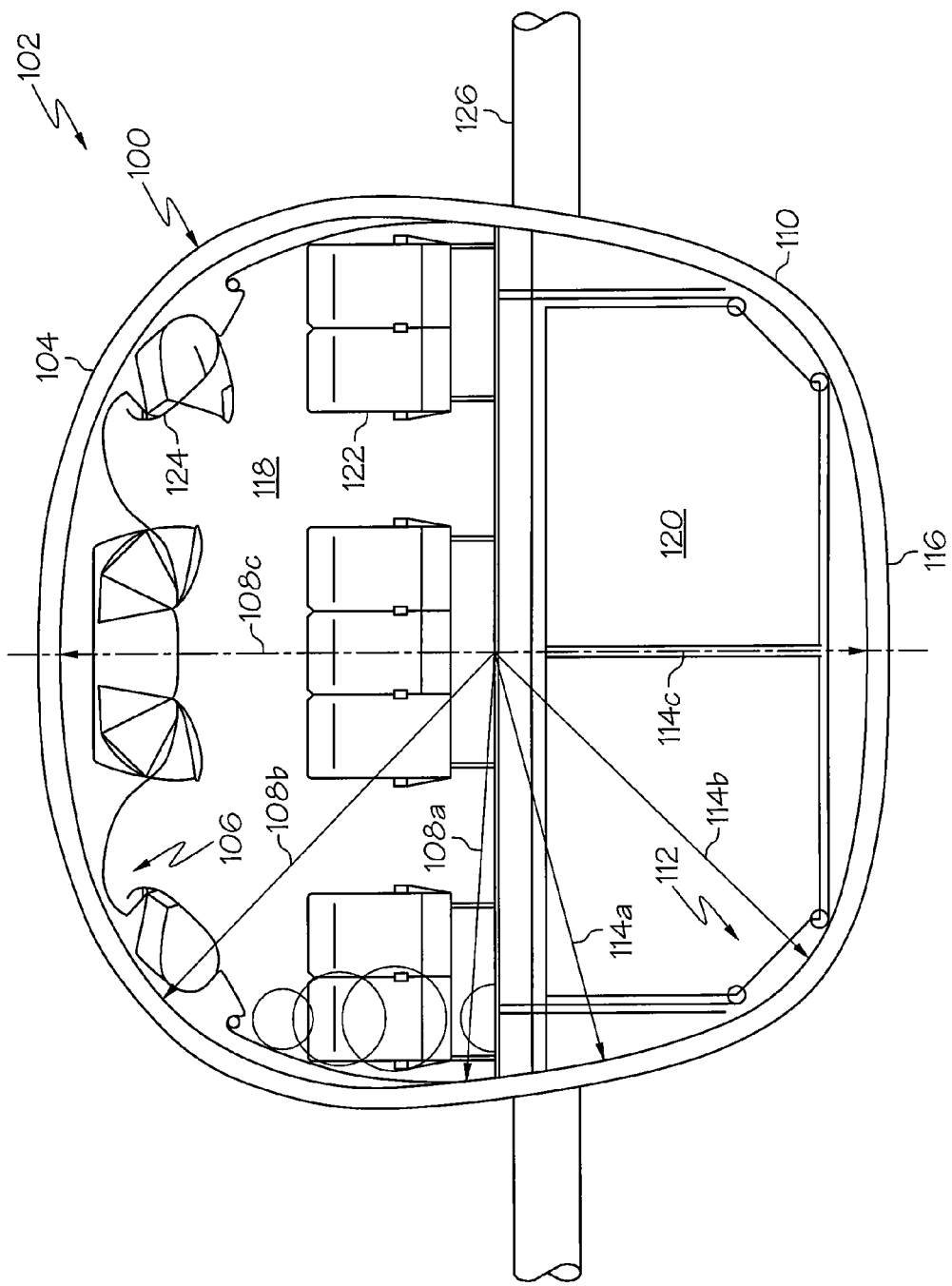
FIG. 1 is a cross-sectional view of an optimized fuselage structure for an aerospace vehicle in accordance with an embodiment of the present invention.

FIG. 1 is a cross-sectional view of an optimized fuselage structure 100 for an aerospace vehicle or aircraft 102 in accordance with an embodiment of the present invention. The fuselage structure 100 may include an upper fuselage portion 104. The upper fuselage portion 104 may include a first, non-circular cross-section 106 defined by a first set of varying radii of curvature 108. The first set of varying radii of curvature 108 may include at least three different radii of curvature 108a-108c. The fuselage structure 100 may also include a lower fuselage portion 110. The lower fuselage portion 110 may include a second, non-circular cross-section 112 defined by a second set of varying radii of curvature 114. The second set of varying radii of curvature 114 may include at least three different radii of curvature 114a-114b. The first set of varying radii 108 may be different from the second set of varying radii 114. Accordingly, the first cross-section 106 may be different from the second cross-section 112. The first cross-section 106 may be wider than the second cross-section 108 and the lower fuselage portion 110 may narrow from the upper fuselage
} portion 104 toward a bottom section 116 or base of the lower fuselage portion 110. The bottom section 116 or base of the lower fuselage portion 110 may be substantially flattened as shown in FIG. 1 to provide added aircraft rotational clearance for take-off and landing compared to a conventional substantially circular cross-sectional fuselage. The additional aircraft rotational clearance may permit the use of shorter landing gear and a lighter overall structural weight. The substantially flattened bottom section 116 may also generate additional lift.

The upper fuselage section 104 may substantially form a passenger compartment 118. The lower fuselage portion 110 may substantially form a cargo hold 120. The passenger compartment 118 may include a plurality of seats 122 and overhead compartments 124. The upper fuselage section 104 may be wider than the lower fuselage portion to accommodate more passenger and crew space and overhead storage space.

The aircraft 102 may also include a wing or pair of wings 126. The wings 126 are suitably attached to the fuselage structure 100 at a predetermined location relative to the passenger compartment 118 and cargo hold 124 as dictated by the aircraft design.

Figure 2:
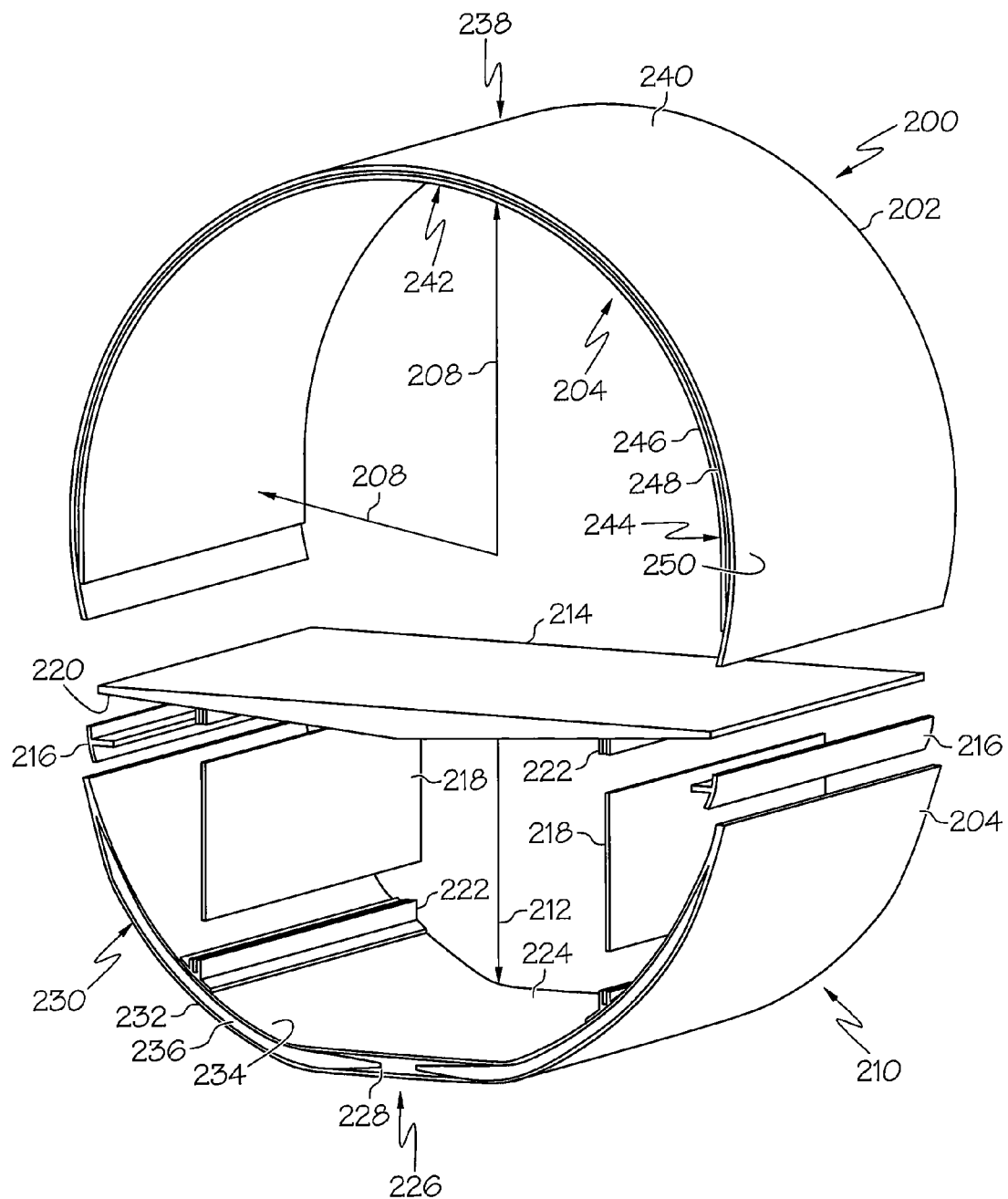
FIG. 2 is an exploded perspective view of an optimized fuselage structure for an aerospace vehicle in accordance with an embodiment of the present invention.

FIG. 2 is an exploded perspective view of an optimized fuselage structure 200 for an aerospace vehicle in accordance with an embodiment of the present invention. The fuselage structure 200 may be used for the fuselage structure 100 of FIG. 1. The fuselage structure 200 may include an upper fuselage portion 202 and a lower fuselage portion 204. The upper fuselage portion 202 may be the same as the upper fuselage portion 104 of FIG. 1 and may include a first, non-circular cross section 206 defined by a first set of varying radii of curvature 208. The lower fuselage portion 204 may be the same as the lower fuselage portion 110 and may include a second, non-circular cross-section 210 defined by a second set of varying radii of curvature 212.

The upper fuselage portion 202 and the lower fuselage portion 204 may be formed as separate fuselage pieces or members. Forming the upper fuselage portion 202 and lower fuselage portion 204 as separate pieces may permit elimination of separate pre-cured structural details, such as frames and other components, and may allow one piece tooling. Forming as separate pieces or members may also enable greater assembly flexibility.

The fuselage structure 200 may also include a unitized one-piece passenger floor 214 disposed substantially between the upper fuselage portion 202 and the lower fuselage portion 204. The fuselage structure 200 may also include floor attachment longerons 216 or similar members to attach the one-piece passenger floor 214 on either side to at least one of the upper fuselage portion 202 and the lower fuselage portion 204 when the fuselage structure 200 is assembled. The unitized one-piece passenger floor 214 and the floor attachment longerons 216 may be formed from a composite material and may be bonded or attached to one another and to at least one of the upper fuselage portion 202 and the lower fuselage portion 204. The floor attachment longerons 216 may also be a joining element forming a combination floor attach and fuselage lap splice fitting to join the upper fuselage portion 202 and the lower fuselage portion 204 and the unitized passenger floor 214. The joining element 216 may be a one-piece or a single element to join each of the passenger floor 214 and the upper and lower fuselage portions 202 and 204.

The fuselage structure 200 may also include unitized stanchion and cargo walls 218 that may be disposed between an underside 220 of the passenger floor 214 and the lower fuselage portion 204. The unitized stanchion and cargo walls 218 may each be a composite sandwich structure as will be described in more detail herein and may be respectively attached to the underside 220 of the passenger floor 214 and to the lower fuselage portion 204 by suitable longerons, pie joints 222 or similar attachment members.

The fuselage structure 200 may also include a unitized or integrated cargo floor 224 defined by or integrated into a substantially flattened bottom or base section 226 of the lower fuselage portion 204. The integrated cargo floor 224 enables a flattened keel with a core structure as described in more detail herein. The fuselage shell or structure 200 also defining the cargo floor structure 224 simplifies construction and provides a more efficient use of materials. As previously discussed, the substantially flattened bottom or base section 226 provides additional aircraft rotational clearance for take-off and landing compared to a conventional substantially circular cross-sectional fuselage. The additional aircraft rotational clearance may permit the use of shorter landing gear and present a lighter overall structural weight. The substantially flattened bottom section 226 may also generate lift under some circumstances. The reduced circumference also creates less wetted surface relative to a round or circular surface for a given configuration. The less the wetted surface, the less the aerodynamic drag.

The fuselage structure 200 may further include an integrated keel beam 228 formed in the lower fuselage portion 204. Examples of integrated keel beam structures that may be used for the integrated keel beam 228 will be described in more detail with reference to FIGS. 6, 7 and 8.

The upper fuselage portion 202 and the lower fuselage portion may be formed from a sandwich structure 230. The sandwich structure 230 may include an outer layer of material 232 and an inner layer of material 234. The outer layer 232 and inner layer 234 may be a composite material or other fabric, metallic material, a combination thereof or other type material suitable for such applications. A core structure 236 may be disposed between the outer layer 232 and inner layer 234. The core structure 236 may be a honeycomb type structure, a foam type material structure, a metallic material structure or other lightweight, high strength material structure.

In accordance with an embodiment of present invention, the fuselage structure 200 may include a hybrid solution or structure and that may include a combination of solid laminate in some locations and a core structure in others. For example, an upper section 238 or crown structure of the upper fuselage portion 202 may have a thicker skin 240 relative to other portions of the fuselage to avoid impact damage, such as from hail when the aircraft is on the ground or lower altitudes, or for other purposes or criteria. Additionally, given that this upper section 238 area may be dominated by tension and low compression, the skin 240 may have a predetermined thickness to provide sufficient stabilization or stiffening to prevent any buckling by the skin 240 alone with a core structure not necessarily being needed. The skin 240 may be formed from a solid laminate structure 242 or the like. The upper fuselage section 202 may then include the solid laminate type structure 242 or skin 240 proximate to the upper section 238 and then transition in a lower section 244 with a sandwich type structure similar to structure 230 with an inner layer 246, core structure 248 and outer layer 250. The inner layer 246 and the outer layer 250 may be integrally formed with inner and outer segments of the solid laminate structure 242. The core structure 248 may be thickest in the lower section 244 and taper in toward the upper section 238. The skin 240 may have an inverse relationship becoming thinner in the lower section 244 relative to the upper section 238 of the upper fuselage portion 202 with more of the structure being core 248 in the lower section 244.

While the fuselage structure 200 of the present invention has been described as including an upper fuselage portion 202 and a lower fuselage portion 204, the fuselage structure 200 could be formed of any number of different portions or may be formed as a single integrated piece as described with reference to FIG. 10

Figure 3:
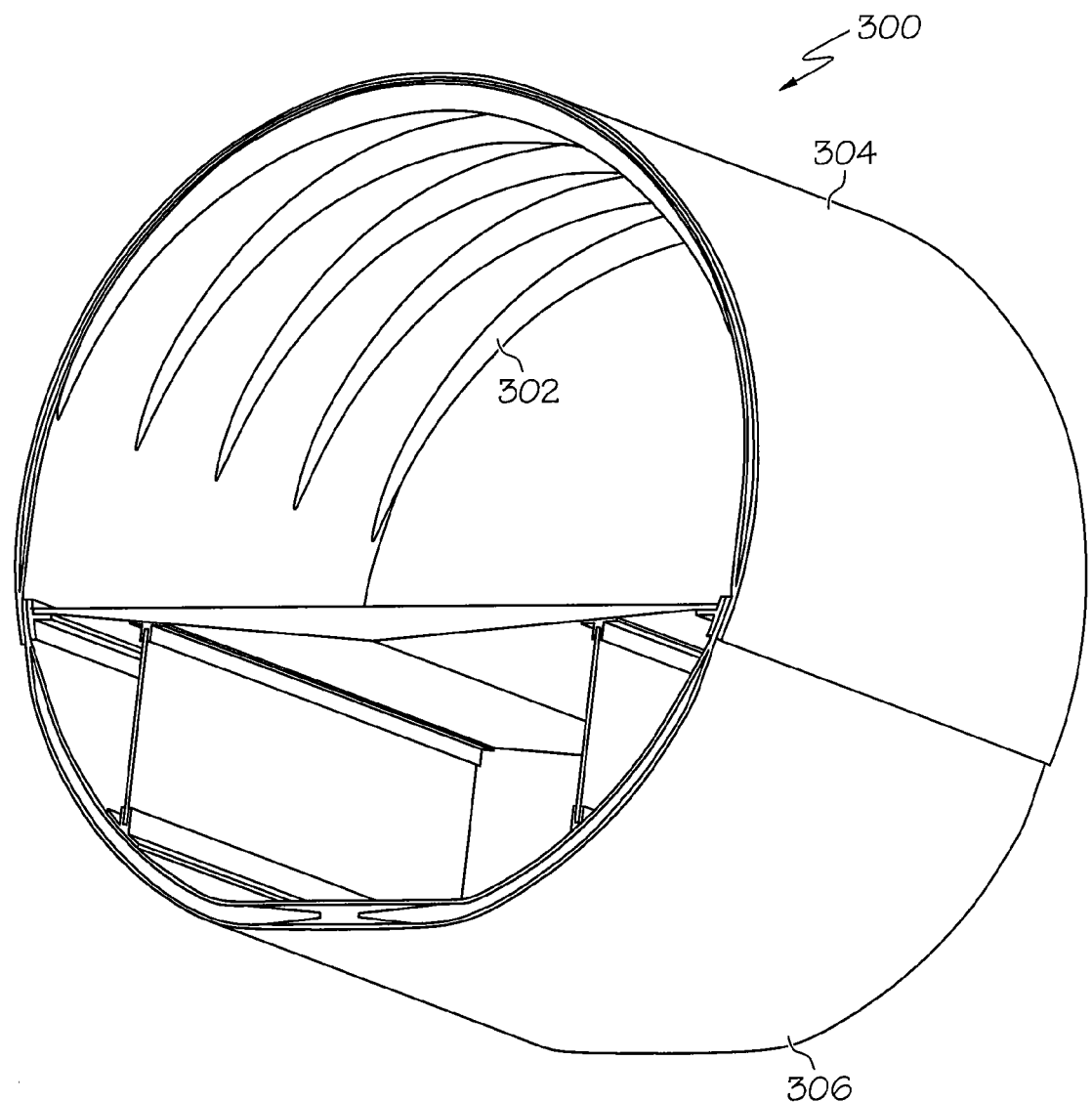
FIG. 3 is a perspective view of an optimized fuselage structure for an aerospace vehicle in accordance with another embodiment of the present invention.

FIG. 3 is a perspective view of an optimized fuselage structure 300 for an aerospace vehicle in accordance with another embodiment of the present invention. The fuselage structure 300 may include a frame structure or a plurality of frame members 302 formed in at least one of an upper fuselage portion 304 and a lower fuselage portion 306. Examples of frame members that may be used for frame members 302 will be described in more detail with reference to FIGS. 4, 5 and 6. Other than the plurality of frame members 302, the fuselage structure 300 may be similar to the fuselage structure 200 of FIG. 1. Accordingly, the fuselage structure 300 may include the same components as those described with respect to the fuselage structure 200.

Figure 4:
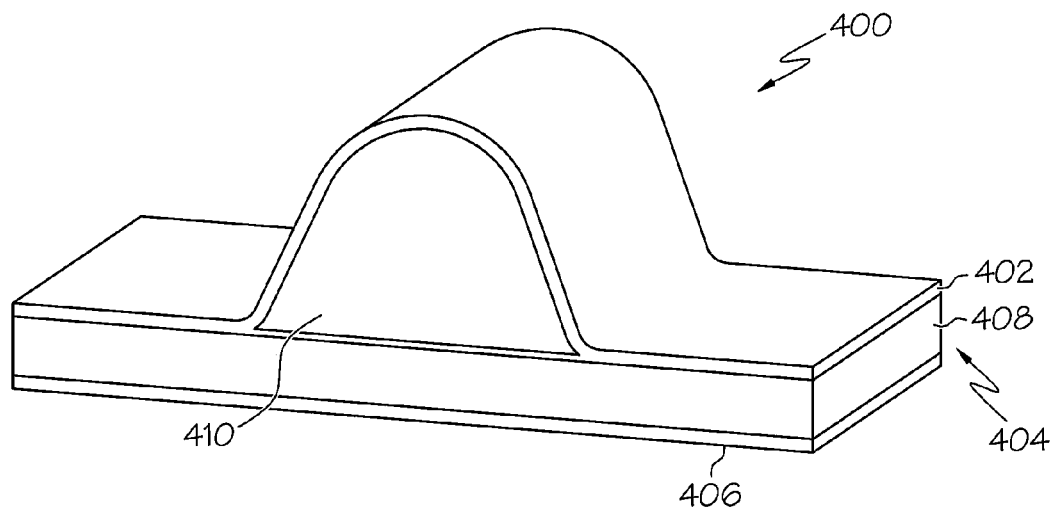
FIG. 4 is an example of a frame member that may be used with an optimized fuselage for an aerospace vehicle in accordance with an embodiment of the present invention.

FIG. 4 is an example of a frame member 400 that may be used with an optimized fuselage for an aerospace vehicle in accordance with an embodiment of the present invention. The frame member 400 may be used for each of the frame members 302 of FIG. 3. The frame member 400 may be integrated in an inner skin 402 or inner layer of material of a sandwich structure 404 of the upper fuselage portion 304 or lower fuselage portion 306 (FIG. 3). Similar to that previously described, the sandwich structure 404 may include an outer layer of material 406. The outer layer of material 406 may be a composite material or fabric, a metallic material or other suitable material. The outer layer 406 may include multiple plies of material or fabric. A core structure 408 may be disposed on the outer layer 406. The core structure 408 may be a honeycomb structure of composite material, a foam material, a metallic material or other lightweight, high strength material. A frame core 410 may be disposed on the core structure 408. The frame core 410 may be a foam, honeycomb type material, metallic material or similar material to provide structural integrity with minimal addition of weight. The inner skin 402 or inner layer of material may be formed on the frame core 410 and the core structure 408. The inner layer of material 402 may be composite material or fabric, metallic material or other suitable material. The inner layer 402 may also include multiple plies of material or fabric.

Figure 5:
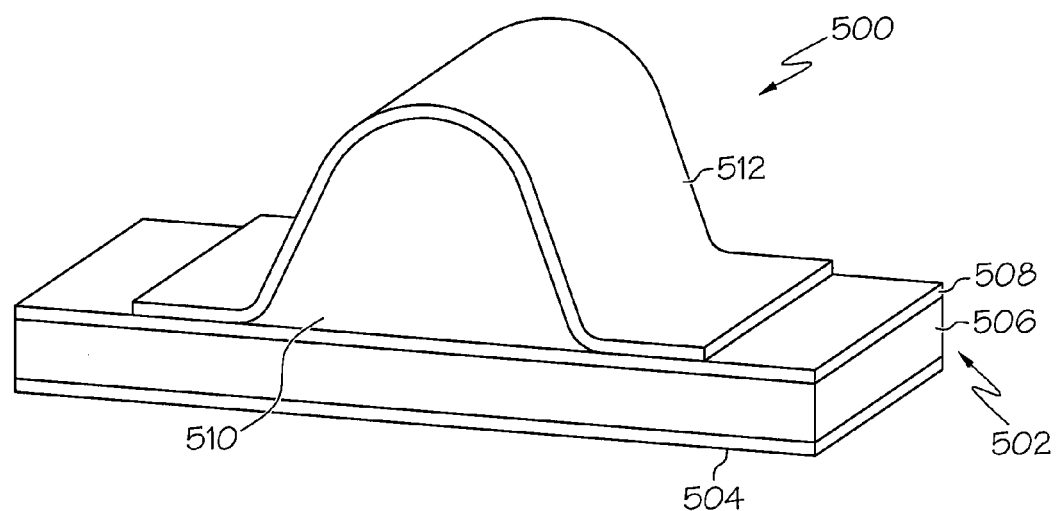
FIG. 5 is an example of another frame member that may be used with an optimized fuselage for an aerospace vehicle in accordance with another embodiment of the present invention.

FIG. 5 is an example of another frame member 500 that may be used with an optimized fuselage for an aerospace vehicle in accordance with another embodiment of the present invention. The frame member 500 may also be used for each of the frame members 302 of FIG. 3. The frame member 500 may be similar to the frame member 400 of FIG. 4. Accordingly, the frame member 500 may include a sandwich structure 502. The sandwich structure 502 may include an outer layer of material 504. The outer layer of material may be composite material or fabric, a metallic material or other suitable material. A core structure 506 may be disposed on the outer layer 504. The core structure 506 may be a honeycomb type structure of composite material or the like, a foam structure, a metallic structure or other material. An inner layer of material 508 may be formed on the core structure 506. The inner layer of material 508 may also be a composite material or fabric, a metallic material or other suitable material. A frame core 510 may be disposed on the inner layer 508. The frame core 510 may be a foam, honeycomb type structure, metallic structure or similar structure to provide structural integrity while adding minimal weight to the structure. A frame ply of material 512 may be formed over the frame core 510. The frame ply 512 may be a composite material or fabric, metallic material or other suitable material. The frame ply 512 may retain the frame core 510 in place and protect the frame core 510.

Figure 6:
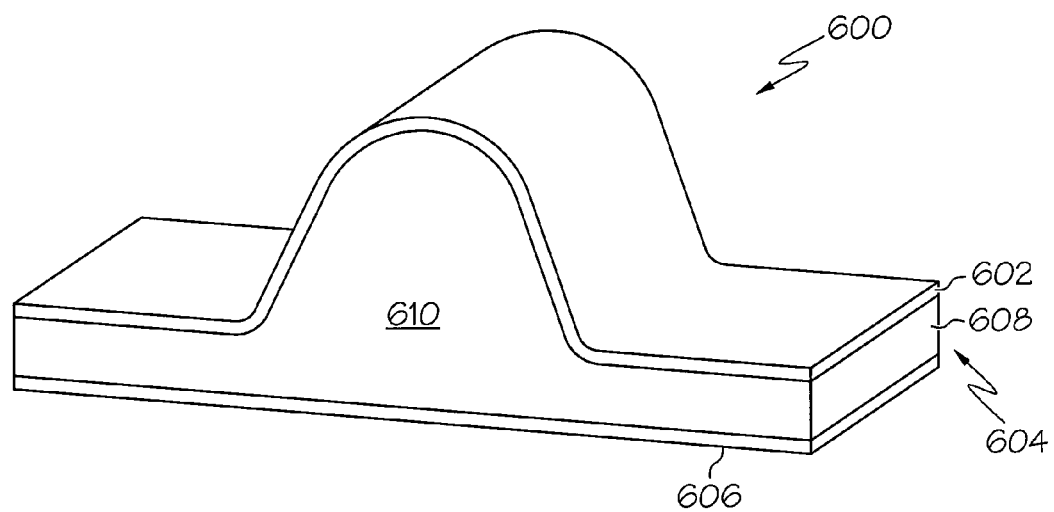
FIG. 6 is an example of a further frame member that may be used with an optimized fuselage for an aerospace vehicle in accordance with a further embodiment of the present invention.

FIG. 6 is an example of a further frame member 600 that may be used with an optimized fuselage for an aerospace vehicle in accordance with a further embodiment of the present invention. The frame member 600 may be used for each of the frame members 302 of FIG. 3. The frame member 600 may be integrated in an inner skin 602 or inner layer of material of a sandwich structure 604 of the upper fuselage portion 304 or lower fuselage portion 306 (FIG. 3). Similar to that previously described, the sandwich structure 604 may include an outer layer of material 606. The outer layer of material 606 may be a composite material or fabric, a metallic material or other suitable material. The outer layer 606 may include multiple plies of material or fabric. A core structure 608 may be disposed on the outer layer 606. The core structure 608 may be a honeycomb structure of composite material, a foam material, a metallic material or other lightweight, high strength material. A frame core 610 may be integrally formed as one piece with the core structure 608. The inner skin 602 or inner layer of material may be formed on the frame core 610 and the skin core structure 608. The inner layer of material 602 may be composite material or fabric, metallic material or other suitable material. The inner layer 602 may also include multiple plies of material or fabric.

Figure 7A:
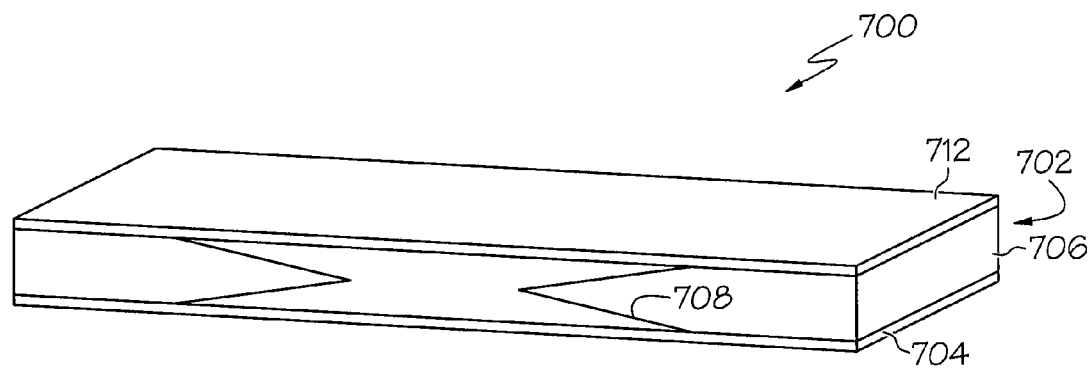
FIG. 7A is an example of an integrated keel beam that may be used with an optimized fuselage in accordance with an embodiment of the present invention.
Figure 7B:
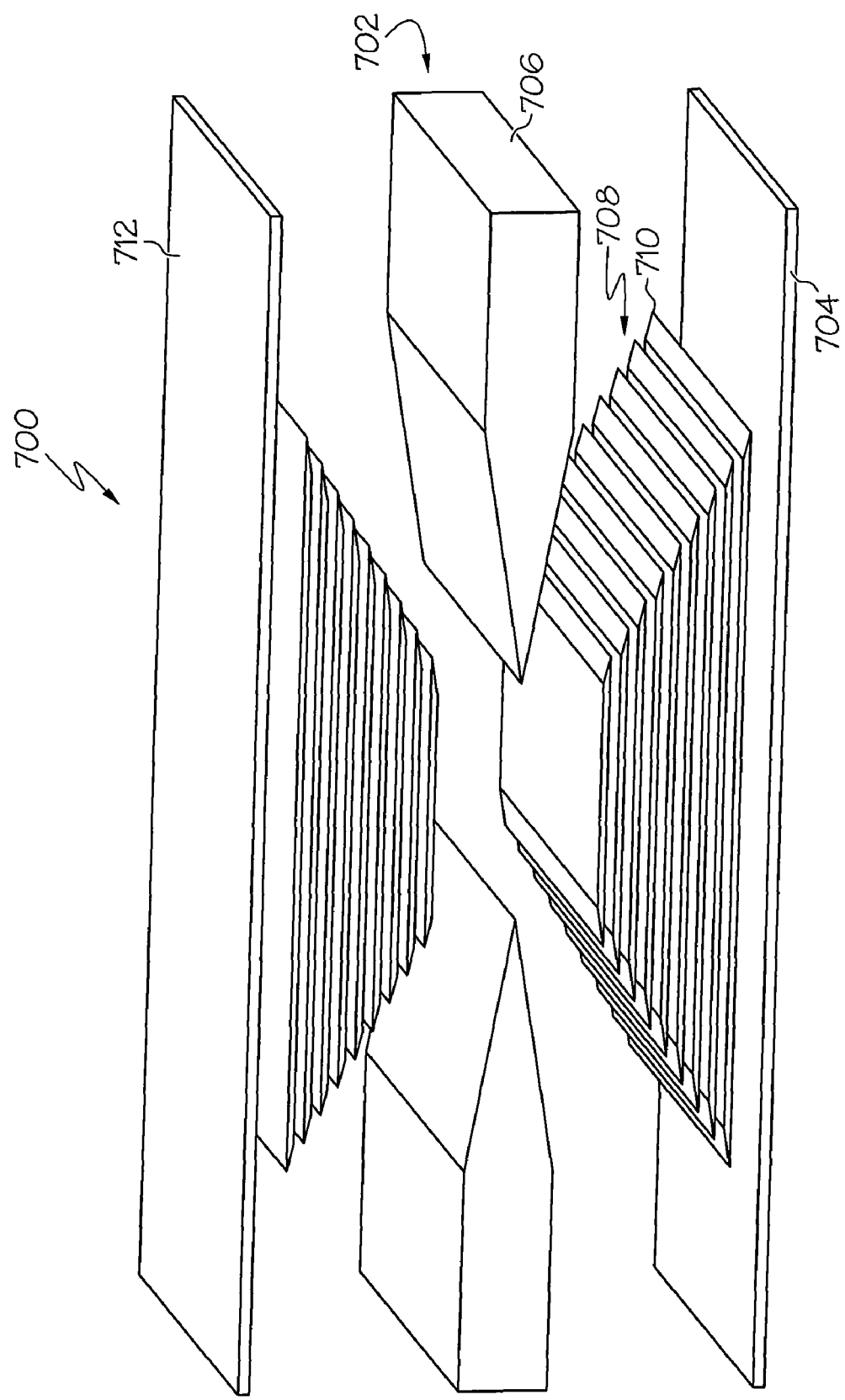
FIG. 7B is an exploded view of the integrated keel beam structure of FIG. 7A.

FIG. 7A is an example of an integrated keel beam structure 700 that may be used with an optimized fuselage in accordance with an embodiment of the present invention. Referring also to FIG. 7B, FIG. 7B is an exploded view of the integrated keel beam structure 700 of FIG. 7A illustrating the structural details of the keel beam 700. The integrate keel beam 700 may be used for the integrate keel beam structure 228 of FIG. 2. The integrated keel beam 700 may be formed in a sandwich structure 702 similar to that previously described. The integrate keel beam structure 700 may include an outer layer of material 704. The outer layer 704 may be a composite material, metallic material or other light weight, high strength material or fabric. The outer layer 704 may include multiple plies of material or fabric. A core structure 706 may be disposed on the outer layer 704. The core structure 706 may be a honeycomb type structure, foam structure, metallic core or similar assembly. The core structure 706 may be formed around a panelized structure 708 to define the keel beam. The panelized structure 708 may include multiple plies or layers of material 710 as best illustrated in FIG. 7B to form a laminate structure to react to loading. The multiple plies of material 710 may be a composite material, fabric or other suitable material. An inner layer of material 712 may be formed on the core structure 706. The inner layer 710 may also be a composite material, fabric, metallic material or other material and may include multiple plies of material or fabric.

Figure 8:
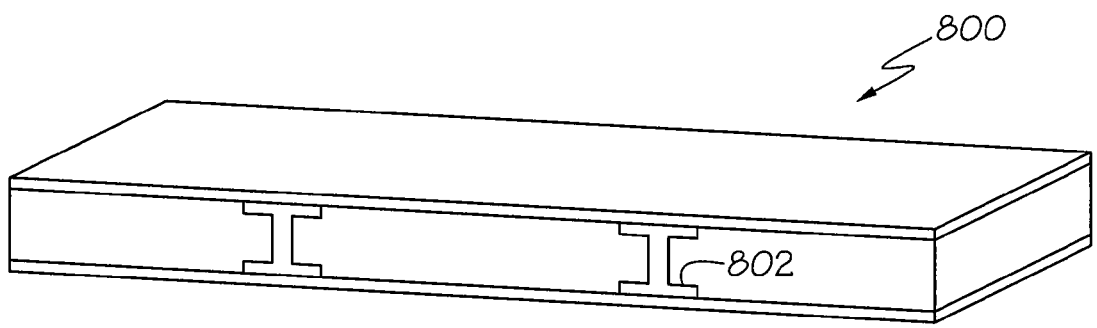
FIG. 8 is an example of another integrated keel beam that may be used with an optimized fuselage in accordance with another embodiment of the present invention.

FIG. 8 is an example of another integrated keel beam 800 that may be used with an optimized fuselage in accordance with another embodiment of the present invention. The integrate keel beam 800 may be used for the integrate keel beam 228 of FIG. 2. The integrated keel beam 800 may be similar to the keel beam 700 except the panelized structure 708 may be replaced with an I-beam structure or structures 802.

Figure 9:
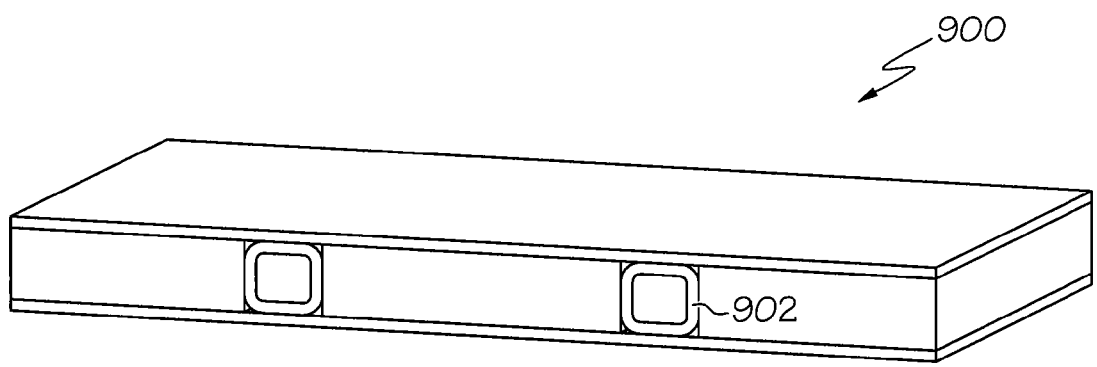
FIG. 9 is an example of a further integrated keel beam that may be used with an optimized fuselage in accordance with a further embodiment of the present invention.

FIG. 9 is an example of a further integrated keel beam 900 that may be used with an optimized fuselage in accordance with a further embodiment of the present invention. The integrate keel beam 900 may also be used for the integrate keel beam 228 of FIG. 2. The integrated keel beam 900 may be similar to the keel beam 700 and 800 except the panelized structure 708 or I-beam structures 802 may be replaced with a box beam structure or structures 902 or any suitable structure.

Figure 10:
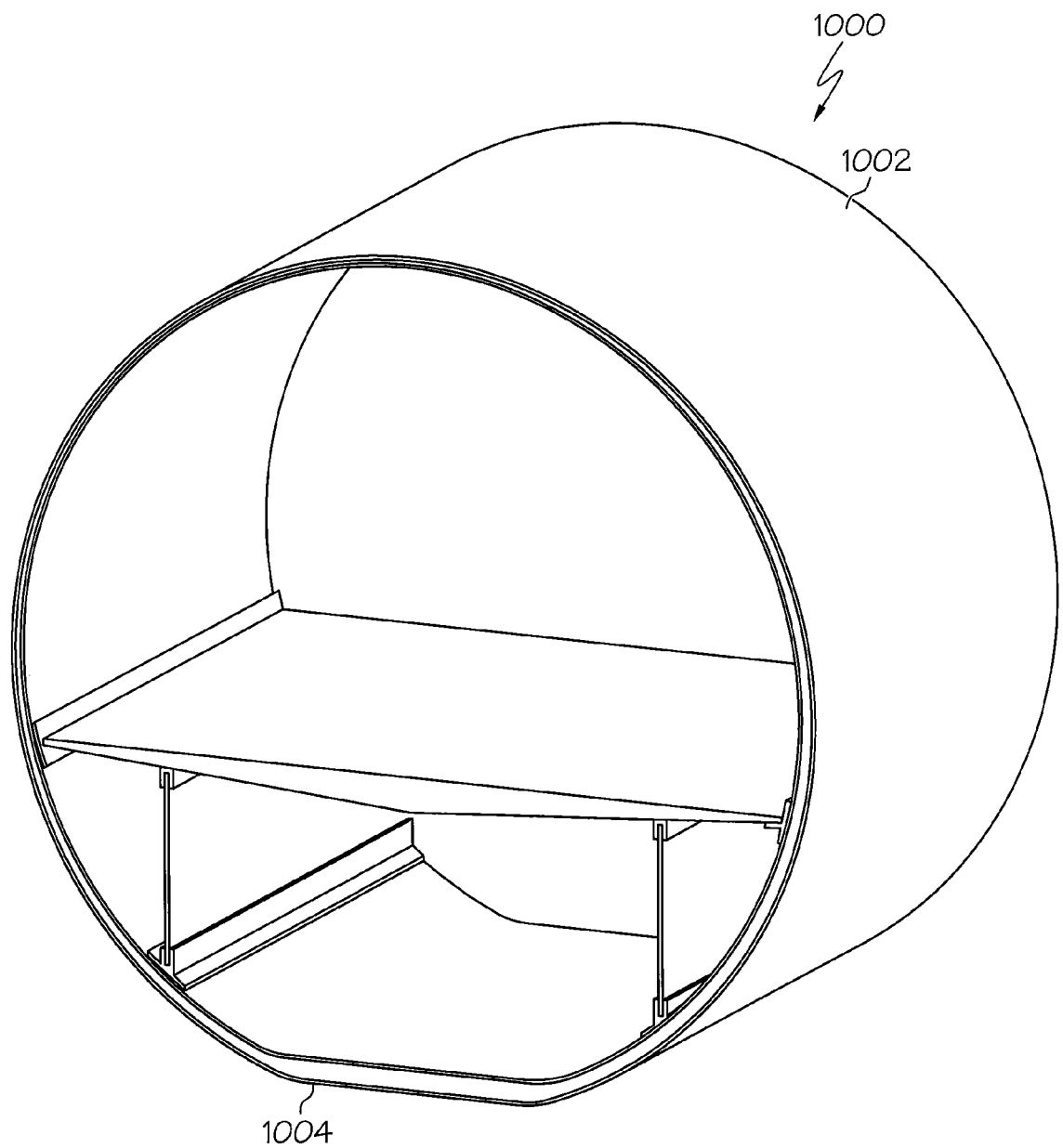
FIG. 10 is a perspective view of another optimized fuselage structure for an aerospace vehicle in accordance with a further embodiment of the present invention.

FIG. 10 is a perspective view of another optimized fuselage structure 1000 for an aerospace vehicle in accordance with a further embodiment of the present invention. The fuselage structure 1000 is similar to the structure 200 of FIG. 2 except the upper fuselage portion 1002 and the lower fuselage portion 1004 are integrally formed as one unitary fuselage piece.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A fuselage structure, comprising:
    an upper fuselage portion defined by a first cross-section including at least three different radii of curvature;
    a lower fuselage portion defined by a second cross-section including at least three different radii of curvature, wherein the first cross-section is different from the second cross-section;
    an integrated keel beam formed in the lower fuselage portion;
    wherein the integrated keel beam comprises:
        an outer layer of material;
        a core structure disposed on the outer layer;
        an inner layer of material formed on the core structure;
        wherein the core structure comprises: a first panelized portion formed of a plurality of stacked tapering layers extending from the inner layer toward the outer layer; a second panelized portion formed of a plurality of stacked tapering layers extending from the outer layer toward the inner layer; a first core member having a first wedge portion on a first side of the first and second panelized portions; a second core member having a second wedge portion on a second side of the first and second panelized portions; and the first and second wedge portions are disposed between corresponding tapered sections of the first and second panelized portions.

2. The fuselage structure of claim 1, wherein the first cross-section is wider than the second cross-section.

3. The fuselage structure of claim 1, wherein the upper fuselage portion comprises a hybrid structure including a solid laminate structure section and a section including a core structure.

4. The fuselage structure of claim 1, wherein the upper fuselage portion and the lower fuselage portion are formed as separate fuselage pieces.

5. The fuselage structure of claim 1, wherein the upper fuselage portion and the lower fuselage portion are integrally formed as one unitary fuselage piece.

6. The fuselage structure of claim 1, wherein the upper fuselage portion and the lower fuselage portion each comprise a sandwich structure.

7. The fuselage structure of claim 6, wherein the sandwich structure comprises:
    an outer layer of material;
    a inner layer of material; and
    a core structure disposed between the outer layer and the inner layer.

8. The fuselage structure of claim 7, wherein the core structure comprises one of a group including a honeycomb type structure and foam.

9. The fuselage structure of claim 1, further comprising a unitized one-piece passenger floor disposed substantially between the upper fuselage portion and the lower fuselage portion.

10. The fuselage structure of claim 9, further comprising a floor attachment longeron to attach the one-piece passenger floor to at least one of the upper fuselage portion and the lower fuselage portion.

11. The fuselage structure of claim 9, further comprising a joining element to define a combination passenger floor attach and fuselage lap splice fitting to attach the passenger floor and upper and lower fuselage portions.

12. The fuselage structure of claim 10, further comprising a unitized stanchion and cargo wall disposed between an underside of the passenger floor and the lower fuselage portion.

13. The fuselage structure of claim 1, further comprising a unitized cargo floor integrated into a substantially flattened base section of the lower fuselage portion.

14. The fuselage structure of claim 1, wherein the lower fuselage portion comprises a substantially flattened bottom section to provide added rotational clearance for take-off and landing compared to a substantially circular cross-sectional fuselage.

15. The fuselage structure of claim 1, further comprising a frame structure formed in at least one of the upper fuselage portion and the lower fuselage portion to reinforce the fuselage structure.

16. The fuselage structure of claim 15, wherein the frame structure is integrated into an inner skin.

17. A fuselage structure, comprising:
    an upper fuselage portion including a sandwich structure and a non-circular cross-section defined by a first set of varying radii of curvature;
    a lower fuselage portion including another sandwich structure and a non-circular cross-section defined by a second set of varying radii of curvature, wherein the first set of varying radii is different from the second set of varying radii;
    an integrated keel beam formed in the lower fuselage portion;
    wherein the integrated keel beam comprises:
        an outer layer of material;
        a core structure disposed on the outer layer;
        an inner layer of material formed on the core structure;
        wherein the core structure comprises: a first panelized portion formed of a plurality of stacked tapering layers extending from the inner layer toward the outer layer; a second panelized portion formed of a plurality of stacked tapering layers extending from the outer layer toward the inner layer; a first core member having a first wedge portion on a first side of the first and second panelized portions; a second core member having a second wedge portion on a second side of the first and second panelized portions; and the first and second wedge portions are disposed between corresponding tapered sections of the first and second panelized portions.

18. The fuselage structure of claim 17, wherein the lower fuselage portion narrows from the upper fuselage portion toward a bottom section of the lower fuselage portion.

19. The fuselage structure of claim 17, wherein the lower fuselage portion comprises a bottom section that is substantially flattened relative to a circular cross-section to provide added rotational clearance for take-off and landing.

20. The fuselage structure of claim 19, further comprising a unitized cargo floor integrated into the substantially flattened bottom section of the lower fuselage portion.

21. The fuselage structure of claim 17, wherein the upper fuselage portion and the lower fuselage portion are integrally formed as one unitary fuselage piece.

22. The fuselage structure of claim 17, wherein the upper fuselage portion and the lower fuselage portion comprise:
an outer layer of material;
a inner layer of material; and
a core structure disposed between the outer layer and the inner layer.

23. The fuselage structure of claim 19, further comprising:
a unitized one-piece passenger floor disposed substantially between the upper fuselage portion and the lower fuselage portion; and
a joining element to define a combination passenger floor attach and fuselage lap splice fitting to attach the passenger floor and upper and lower fuselage portions.

24. An aircraft, comprising:
a fuselage including:
an upper fuselage portion defined by a first cross-section including at least three different radii of curvature,
a lower fuselage portion defined by a second cross-section including at least three different radii of curvature, wherein the first cross-section is different from the second cross-section;
a wing attached to the fuselage;
an integrated keel beam formed in the lower fuselage portion;
wherein the integrated keel beam comprises:
an outer layer of material;
a core structure disposed on the outer layer;
an inner layer of material formed on the core structure;
wherein the core structure comprises: a first panelized portion formed of a plurality of stacked tapering layers extending from the inner layer toward the outer layer; a second panelized portion formed of a plurality of stacked tapering layers extending from the outer layer toward the inner layer; a first core member having a first wedge portion on a first side of the first and second panelized portions; a second core member having a second wedge portion on a second side of the first and second panelized portions; and the first and second wedge portions are disposed between corresponding tapered sections of the first and second panelized portions.

25. The aircraft of claim 24, wherein the lower fuselage portion narrows from the upper fuselage portion toward a bottom section of the lower fuselage portion.

26. The aircraft of claim 24, wherein the lower fuselage portion comprises a bottom section that is substantially flattened relative to a circular cross-section to provide added rotational clearance for take-off and landing and less wetted surface area.

27. The aircraft of claim 26, further comprising a unitized cargo floor integrated into the substantially flattened bottom section of the lower fuselage portion.

28. The aircraft of claim 24, wherein the upper fuselage portion and the lower fuselage portion are integrally formed as one unitary fuselage piece.

29. The aircraft of claim 24, wherein the upper fuselage portion and the lower fuselage portion each comprise a composite sandwich structure.

30. A method for making a fuselage structure, comprising:
forming an upper fuselage portion including a non-circular cross-section defined by a first set of varying radii of curvature; and
forming a lower fuselage portion including a non-circular cross-section defined by a second set of varying radii of curvature, wherein the first set of varying radii is different from the second set of varying radii;
forming an integrated keel beam in the lower fuselage portion;
wherein forming the integrated keel beam comprises:
forming an outer layer of material;
forming a core structure disposed on the outer layer;
forming an inner layer of material formed on the core structure;
wherein forming the core structure comprises: forming a first panelized portion of a plurality of stacked tapering layers extending from the inner layer toward the outer layer; forming a second panelized portion of a plurality of stacked tapering layers extending from the outer layer toward the inner layer; forming a first core member having a first wedge portion on a first side of the first and second panelized portions; forming a second core member having a second wedge portion on a second side of the first and second panelized portions; and forming the first and second wedge portions disposed between corresponding tapered sections of the first and second panelized portions.

31. The method of claim 30, further comprising joining the upper fuselage portion to the lower fuselage portion.

32. The method of claim 30, further comprising integrally forming the upper fuselage portion and the lower fuselage portion as one unitary fuselage piece.

33. The method of claim 30, wherein forming the upper fuselage portion and the lower fuselage portion comprises:
forming an outer layer of material;
depositing a core structure on the outer layer of material; and
forming an inner layer of material on the core structure.

34. The method of claim 30, wherein forming the upper fuselage portion comprises forming a hybrid structure.

35. The method of claim 34, wherein forming the hybrid structure comprises:
forming a solid laminate structure in an upper section of the upper fuselage portion;
forming a sandwich core type structure in a lower section of the upper fuselage portion; and
transitioning between the solid laminate structure and the sandwich core structure.

36. The method of claim 30, wherein forming the lower fuselage portion comprises forming a bottom section that is substantially flattened relative to a circular cross-section to provide added rotational clearance for take-off and landing.

37. The method of claim 36, further comprising forming a unitized cargo floor integrated into the substantially flattened bottom section of the lower fuselage portion.

* * * * *